United States Patent [19]

Hakeem

[11] Patent Number: 5,357,052
[45] Date of Patent: Oct. 18, 1994

[54] OVERHEAD ELECTRICAL POWER SUPPLY SYSTEM

[76] Inventor: Fahmee Hakeem, 14032 Cordary Ave., Hawthorne, Calif. 90250

[21] Appl. No.: 887,901

[22] Filed: May 26, 1992

[51] Int. Cl.⁵ ............................................. H02G 3/26
[52] U.S. Cl. ......................................... 174/48; 248/51
[58] Field of Search ................. 174/48; 248/51, 52, 248/65, 70; 362/387, 391, 432

[56] References Cited

U.S. PATENT DOCUMENTS

| | | | |
|---|---|---|---|
| 868,888 | 10/1907 | Richardson | 362/432 X |
| 2,950,892 | 8/1960 | Rick | 362/432 X |
| 4,449,172 | 5/1984 | Warshawsky | 362/432 X |
| 4,479,030 | 10/1984 | Votteler et al. | 174/48 |

*Primary Examiner*—Gerald P. Tolin
*Assistant Examiner*—David Tone
*Attorney, Agent, or Firm*—Robert Schaap

[57] ABSTRACT

An over electrical power supply system for delivering of electrical power to a plurality of instruments in an environment which has a generally vertical wall such as a room. The electrical instruments of the type used with this system are operable with electrical power. The power supply system comprises a plurality of conduits which are secured to a generally vertically disposed wall and have angularly outwardly struck portions which extend from the vertical portions of the conduit and which are generally horizontally located. A mechanism is located at the ends of each of these arms for retaining an electrical implement such as a barbershop hair clipper, a razor or the like. This mechanism is designed to releasably retain the instruments and to deliver electrical power to these instruments. Electrical conductors extend through the conduits to these mechanisms to supply electrical power to the instruments connected thereto. The mechanisms which are capable of holding the instruments are also provided with a wind-up device so as to wind-up any dispensed electrical cord connected to the instruments.

18 Claims, 2 Drawing Sheets

OVERHEAD ELECTRICAL POWER SUPPLY SYSTEM

BACKGROUND OF THE INVENTION

1. Field of the Invention

This invention relates in general to certain new and useful improvements in overhead electrical power supply systems, and more particularly, to overhead electrical power supply systems of the type which are capable of releasably retaining an instrument and for delivering electrical power to that instrument and which are also movable so as to be ideally positioned for the user.

2. Brief Description of the Prior Art

Barbers and hair stylists and others who have frequent temporary need for electrically operable instruments in performing certain tasks usually have these electrical instruments at a desk or table level. Barbers and hair stylists and others in similar occupations will frequently use one type of clipper or razor or other electrically operable instrument for a short period of time and then switch to another type of instrument for performing a different type of cut or operation. In each case, the barber or stylist will hang the instrument on a hook secured to a table or back bar. The same table or back bar is also used to hold other devices and compositions which are used by the barber or stylist.

In addition to the foregoing, the barber and hair stylist must often rely upon general overhead lighting, such as light fixtures which are mounted in the ceiling of a particular room. By definition, the stylist or barber is not capable of positioning that light fixture in order to obtain optimum light distribution on a subject, that is on the hair of the subject which he or she is cutting or styling.

In addition to the foregoing, generally all electrically operable instruments are connected by a conductor to a source of electrical power. These electrical conductors or so-called "wires" tend to interfere and generally obstruct the use of the instrument and even when hung on a hook, the wires dangle on a floor or like surface obstructing the movement of the operator and also result in an unsightly appearance.

It would be desirable to provide some mechanism by which the instruments could be hung on an overhead support and withdrawn and re-hung on the overhead support and to also have a light which can be positionally directed by the operator.

OBJECTS OF THE INVENTION

It is, therefore, one of the primary objects of the present invention to provide an overhead power supply system in which an electrically operable instrument can be hung on an overhead conduit and which can be removed from and re-hung on that conduit.

It is another object of the present invention to provide an overhead electrical power supply system of the type stated in which a source of electrical power is routed through the conduit so that an electrically operable instrument can be connected to that source of electrical power at the end of a conduit.

It is a further object of the present invention to provide an overhead electrical power supply system of the type stated which is comprised of a plurality of conduits and which are rotatable so as to be positionable by an operator using this power supply system.

It is an additional object of the present invention to provide an overhead electrical power supply system of the type stated which is provided with a source of light and which can be manipulated by an operator in order to provide optimum lighting conditions.

It is another salient object of the present invention to provide an overhead electrical power supply system of the type stated which can be manufactured at a relatively low cost and which is highly efficient in operation.

With the above and other objects in view, my invention resides in the novel features of form, construction, arrangement and combination of parts presently described and pointed out in the claims.

BRIEF SUMMARY OF THE INVENTION

An overhead electrical power supply system for delivery of electrical power t a plurality of instruments in an environment which has a generally vertical wall, as for example, in a room having a wall and a ceiling. The instruments are operable with electrical power. In one preferred embodiment, the electrical instruments are those used by a barber or hair stylist and include, but are not limited to, razors and similar electric cutting instruments.

While the present invention is described in terms of an overhead electric power supply system for use with barbers and hair stylists, it should be understood that the invention is not necessarily so limited and could be used in other occupations. Nevertheless, the invention has been designed primarily for and is highly effective with the use of those instruments employed by barbers and hair stylists and similar operators.

The electrical power supply system comprises a plurality of conduits which are secured to a generally vertical wall and extend outwardly from that wall. Each of the conduits have free ends, that is, ends which are disposed outwardly from and away from the wall. A retaining means is located at the free ends of certain of the conduits and preferably all of the conduits. This retaining means is designed to releasably retain the instruments which are operable with the electric power.

Electrical conductors extend through each of the conduits and are connected to a source of electrical power. These conductors will supply electrical power at the ends of each of the retaining means and to each of the instruments which are removably retained on these separate retaining means.

The present invention also provides a retracting means which is often referred to as a wind-up mechanism at each of the retaining means. This retracting means or so-called wind-up mechanism is designed for winding and retracting an electrical cable which may be pulled outwardly away from the conduit. Thus, after an instrument has been pulled away from the end of the conduit, the wind-up mechanism will cause a re-winding of the electric cable or cord so that it is stored and out of the way.

Each conduit forming part of the overhead electrical power supply system has a generally vertical leg and an angularly bent outwardly extending arm and the latter of which is somewhat horizontally disposed. The generally vertical leg of each conduit is hingedly mounted to the wall by means of a bracket. In this way, the conduit can be hingedly turned on the bracket to a desired position.

The electrical instrument, such as the razor or cutting instrument or the like, is actually suspended from the retaining means. Each instrument would usually have an electrical cord for supplying electrical power to the instrument. In this way, the instrument can be pulled downwardly from the conduit and used by an operator. When the operator has finished using this instrument, the wind-up mechanism will automatically cause a retraction of the electrical cord and wind the same onto a spool or like device. The winding mechanism is preferably a spring operated mechanism which causes rotation of the spool when there is a releasing action by the operator.

This invention possesses many other objects and advantages which will become more clearly apparent from a consideration of the forms in which it may be embodied. One of these forms is described in the detailed description of this invention and is illustrated in the accompanying drawings. However, it should be understood that this detailed description and the accompanying drawings are only set forth for purposes of illustrating the general principles of the invention and that this detailed description and the drawings are not to be taken in a limiting sense.

BRIEF DESCRIPTION OF DRAWINGS

Figure 1:
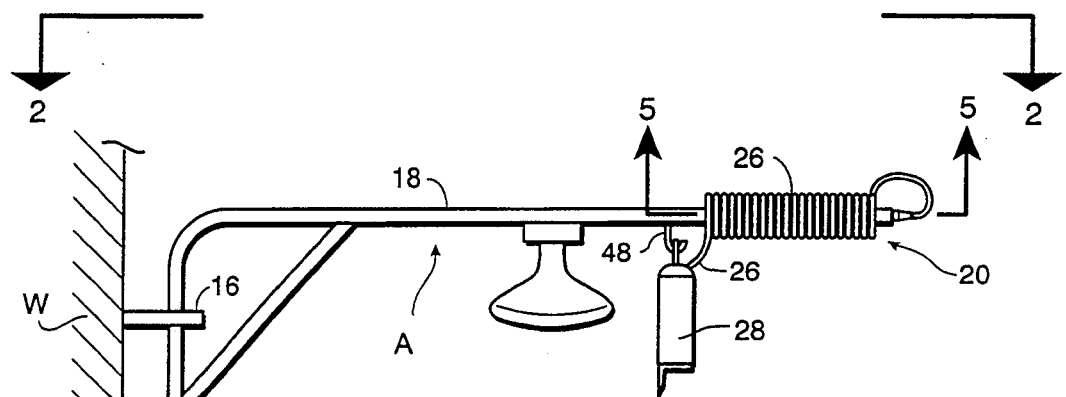
Figure 2:
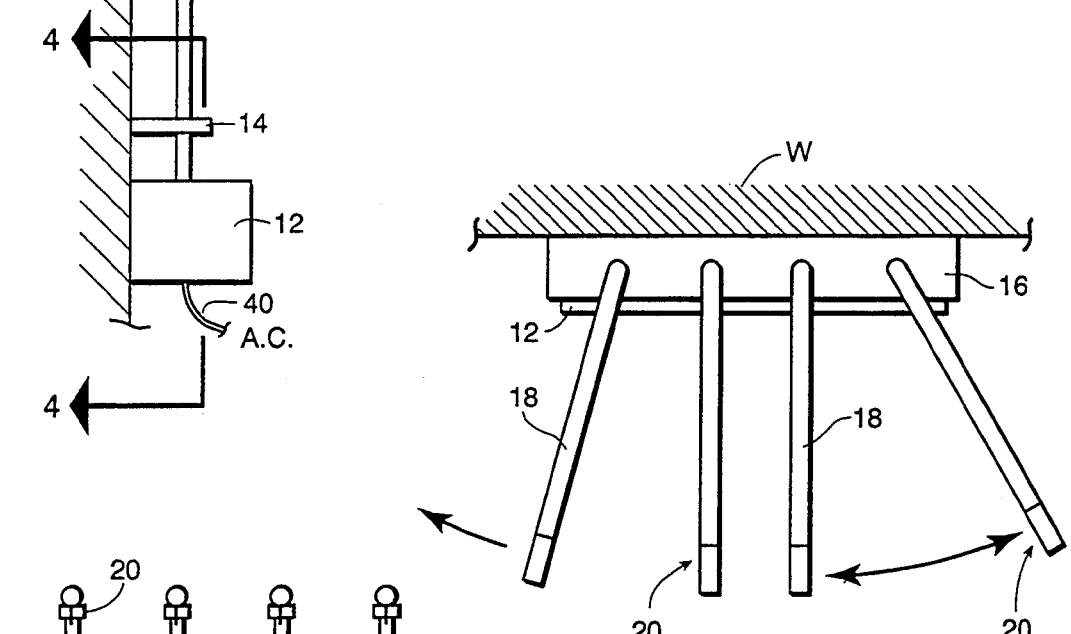
Figure 3:
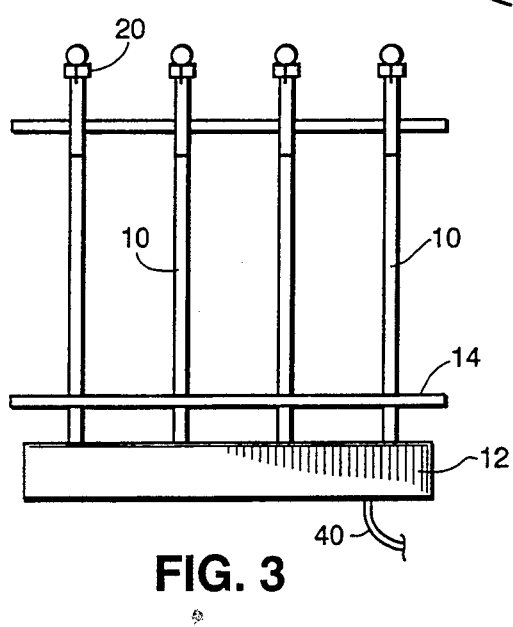
Figure 4:
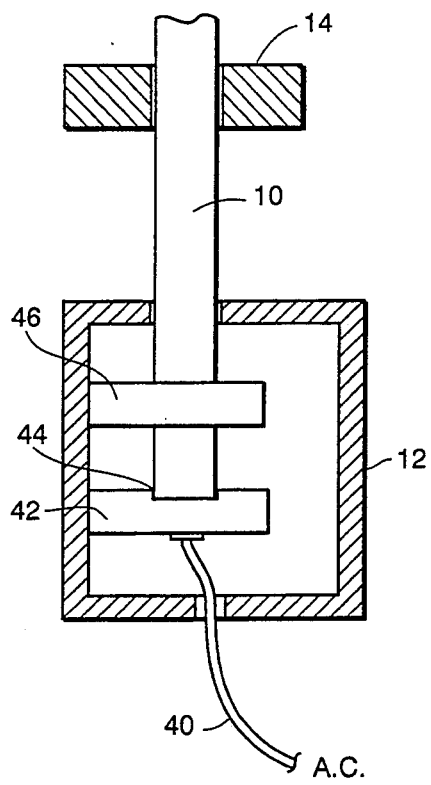
Figure 6:
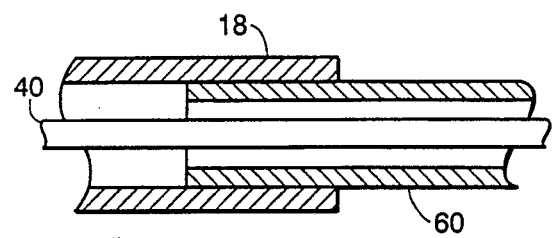
Figure 7:
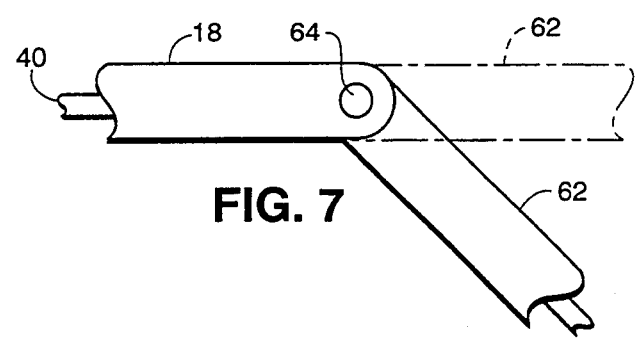
Figure 5:
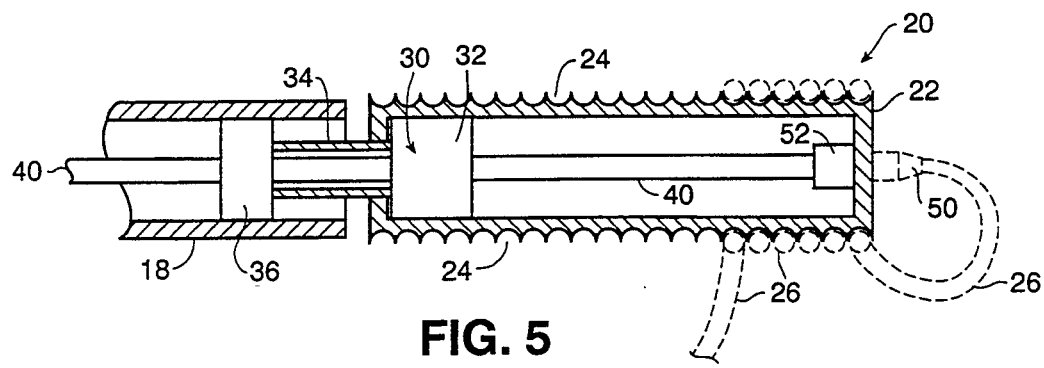

Having thus described the invention in general terms, reference will now be made to the accompanying drawings (two sheets) in which:

FIG. 1 is a side elevational view of an overhead electrical power supply system constructed in accordance and embodying the present invention and shown as being connected to a wall;

FIG. 2 is a top plan view of the overhead electrical power supply system of FIG. 1;

FIG. 3 is a front elevational view of the overhead electrical supply system of the present invention;

FIG. 4 is a vertical sectional view taken along line 4—4 of FIG. 1;

FIG. 5 is a fragmentary vertical sectional view taken through a wind-up mechanism at the outer end of each of the power supply arms system, and taken substantially along line 5—5 of FIG. 1;

FIG. 6 is a fragmentary vertical sectional view showing a modified form of the overhead electrical power supply system in which the arms may be telescopically extensible; and FIG. 7 is a fragmentary side elevational view, partially in phantom lines, and showing arrangement in which the arms have pivotally attached sections.

DETAILED DESCRIPTION OF PREFERRED EMBODIMENTS

Referring now in more detail and by reference characters to the drawings which illustrate several practical embodiments of the present invention, "A" designates an electrical power supply system which is primarily adapted for, although not exclusively limited to, use in hair salons. However, the overhead electrical power supply system of the invention will be described in connection with its use in a hair salon although it is to be understood that this is only exemplary of one of the uses of the invention and that this power supply system can find wide-spread use in other numerous applications.

The overhead electrical power supply system of the present invention is generally mounted to a fixed support structure such as a vertical wall W. The overhead power supply system A generally comprises a plurality of spaced apart vertically arranged conduit-carrying power supply legs 10 which are journaled in a lower junction box 12 in a manner to be hereinafter described in more detail. These vertical conduit-carrying legs 10 are also supported by and journaled within brackets of 14 and 16 which are, in turn, secured to the wall W or other vertical-supporting structure. The brackets 14 and 16 may be of a relatively simple construction in the nature of a retaining blocks which are suitably appertured in order to receive the vertically-arranged legs 10. Moreover, if required, they may be provided with ball bearing races on the interior of the openings to receive the vertical legs 10.

In the embodiment of the invention as illustrated, the overhead electrical supply system is provided with four vertically-arranged conduit-carrying legs 10. However, it should be understood that any number of legs could be employed depending upon the number of electrical outlets and/or the amount of lighting which may be required at a particular work station or location. Each of the legs 10 integrally merge at their upper ends into outwardly extending arms 18 as best illustrated in FIGS. 1 and 2 of the drawings.

The outer end of each of the arms 18 is provided with a retaining means 20 in the nature of a large head 22 having a spiral groove 24 to receive an electrical cable 26. In this way, an electrically operably instrument 28 as for example, a hair clipper, could have its connecting wire 26 wound about the spiral groove of the enlarged head 22. Here again, it should be understood that any form of electrically operable instrument could be carried by and used with the overhead electrical supply system. However, and as indicated previously, this embodiment of the invention is shown and described in connection with use in hair salons and thus, the instrument in this particular case is shown as a hair clipper.

Each of the retaining means 20, such as the enlarged heads 22, may be provided with a retracting mechanism 30 or so-called "wind-up mechanism." The wind-up mechanism in one of these enlarged heads 22 is also more fully illustrated in FIG. 5 of the drawings. This retracting mechanism 30 comprises a wind-up spool 32 having an axially-extending shaft 34 connected to a fixed circular block or retaining ring 36 located within the outer end of the arm 18.

The wind-up head 32 may be located in the enlarged head 22 as illustrated in FIG. 5 and may be secured thereto. In accordance with this construction, the enlarged head 22 and hence, the entire retaining means 20, is supported at the outer end of the arm 18 by means of the wind-up mechanism 30 and particularly, the wind-up head 32 and the arm 34. The arm 34 is journaled within the retaining ring 36 so that the wind-up head 32, and hence, the enlarged head 22, are rotatable about the outer end of the arm 18.

A spiral spring with a release lock mechanism could also be provided so that the entire enlarged head rotates when the electrical cable 26 is pulled in one direction to release the lock mechanism thereby enabling an automatic winding of the electrical cable 26 on the groove 24 of the enlarged head 22. In like manner, when the user desires to dispense a selected amount of electrical cable 26 from the enlarged head 22, the user merely pulls on the instrument to which the electrical cable 26 is connected until the desired amount of cable has been dispensed. The locking mechanism which holds the enlarged head 22 in a selected position after dispensing of the cable may typically adopt the form of a ratchet mechanism. However, this entire retracting mechanism has neither been illustrated nor described in further detail herein inasmuch as these retracting mechanisms are conventional in their construction. The retracting mechanism described herein, however, has been found to be effective with the ratchet locking mechanism.

The lower ends of each of the legs 10 are journaled in the lower junction box 12, as aforesaid, and as also more fully illustrated in FIG. 4 of the drawings. The junction box is referred to as a "junction box" inasmuch as it receives an electrical conductor such as an alternating current conductor 40. The junction box 12 contains a lower bearing plate 42 which has a recess 44 to receive the lower end of the leg 10. If desired, a suitable bearing could be located within the recess 44 to aid in rotation of the leg 10 and hence, the arm 18. Further, an alignment block 46 is also located within and secured to the rear wall of the junction box 14.

In accordance with the foregoing construction, it can be observed that a separate electrical instrument can be located at the outer end of each of the arms 18. Furthermore, and for this purpose, a hook 48 may be located on the underside of each of the arms 18 adjacent to the retaining means 20. Thus, when a barber or hair stylist desires to use a particular electrical instrument, he or she can readily remove the same from the hook 48, and pull downwardly on the instrument to unwind the connecting electrical conductor from the retaining head. After the barber or stylist has completed use of that particular instrument, he can merely cause the electrical cable to be wound upon the enlarged head and again suspend the end steel electrical instrument 28 from the hook 48. For purposes of connecting the instrument to the open head electrical supply system, the instrument itself may be literally hard-wired into the electrical conductor 40. In like manner, the end of the cable 26 is normally provided with a plug 50. That plug 50 can be connected to a socket 52 at the outer end of the enlarged head 22 and which socket is directly connected to the electrical conductor 40.

The outer ends of each of the arms 18 may also be provided with a light 56 and which may also be connected to the electrical conductor 40. Furthermore, if desired, a separate light switch could be employed. The overhead electrical power supply system of the invention can be made with a very decorative appearance, as for example, a chrome surfaced tubing or the like. Further, the overhead electrical power supply system of the invention can be constructed so that it will provide a decorative appearance to match a desired decor. Nevertheless, the overhead electrical power supply system of the invention is highly effective in that a user of this system at a particular work station can pivot the arm 18 in a desired horizontal radius to a particular location where maximum lighting may be desired or where immediate access to an electrical instrument is desired.

FIG. 6 illustrates an alternate embodiment of an overhead electrical power supply system in which the outer end of the arm 1B is provided with a telescopically located section 60. The telescopic section 60 may be pulled outwardly from the arm 18 or it may be retracted and stored within the arm 18. In accordance with this construction, the user of the overhead electrical supply system can extend the arm axially outwardly to a desired location as well as to move the arm radially to a desired location. Beyond this, the telescopic arm 60 would be provided with the retaining means 20 and alternately, if desired, with the retracting means 30.

The telescopic arm 60 is effective and in this case, since the arm 18 is tubular in construction, the telescopic arm 60 can immediately be adapted to the invention, if desired. An extra length of electrical cable 40 would be required when using the telescopic arm 60. However, there is more than ample space within the arm 18 and, for that matter within the leg 10, to store the extra cable when the telescopic arm 60 is retracted within the arm 18.

FIG. 7 illustrates another embodiment of the invention in which a hingedly connected section 62 is connected to the outer end of each of the arms 18. Again, and in this regard, a separate retaining means 20 would be connected to the outer end of the arm 62. Further, if desired, the retracting mechanism 30 would also be employed at the outer end of the arm 62. In accordance with the construction of FIG. 7, it can be observed that the user of the overhead electrical power supply system can pull the arm downwardly about a pivot mechanism 64.

If the embodiment of FIG. 6 is employed in conjunction with the embodiment of FIG. 7, then the user can pull the arm outwardly to a desired location and can rotate the arm horizontally to a desired location and moreover, can pull the arm downwardly to a desired height. Beyond this, the overhead electrical power supply system operates substantially in the same manner as previously described.

Thus, there has been illustrated and described a unique and novel overhead electrical power supply system which permits a user to obtain immediate access to an electrical instrument and which is highly effective in operation. Therefore, the overhead electrical power supply system of the invention fulfills all of the objects and advantages which have been sought therefor. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by Letters Patent is:

1. An overhead electrical power supply system for delivery of electrical power to a plurality of motorized instruments in an environment which has a generally vertical wall and which instruments have motors which are operable with electrical power, said power supply system comprising:
   a) a plurality of conduits secured to said wall and extending outwardly from said wall and having free ends;
   b) hook-like retaining means at the free ends of certain of said conduits for releasably retaining the instruments which are operable with electrical power;
   c) cooperative coupling means on said instruments and cooperating with the retaining means so that said electrical instruments can be easily lifted off of and easily resuspended on said retaining means;
   d) electrical conductors located in at least some of the conduits and extending to said retaining means; and
   e) means for supplying electrical power through the conductors to each of said retaining means.

2. The overhead electrical power supply system of claim 1 further characterized in that a retractor means is associated with each retaining means for retracting an electrical cord from an instrument after an instrument is pulled outwardly from said retaining means.

3. The overhead electrical power supply system of claim 1 further characterized in that each said conduit has a generally vertical leg and an angularly bent outwardly extending somewhat horizontal leg.

4. The overhead electrical power supply system of claim 3 further characterized in that the generally vertical leg of each conduit is operatively mounted to said wall in such manner that it is relatively parallel to said wall.

5. The overhead electrical power supply system of claim 4 further characterized in that a bracket means is secured at said wall and each of said conduits are hingedly mounted to said bracket means.

6. The overhead electrical power supply system of claim 1 further characterized in that each retaining means enables a suspension of an instrument and that each instrument has an electrical cord connected to a conductor of a conduit, and each instrument can be pulled downwardly and where the cord can be retracted back toward the retaining means.

7. The overhead electrical power supply system of claim 1 further characterized in that said somewhat horizontal leg has a telescopic section.

8. An overhead electrical power supply system for delivery of electrical power to a motorized hair cutting or styling instrument which have electrical motors operable with electrical power and in a hair styling or cutting environment which has a generally vertical wall, said power supply system comprising:
   a) a conduit having a generally vertical leg and an angularly bent outwardly struck somewhat horizontal leg;
   b) means for mounting said vertical leg to said generally vertical wall;
   c) hook-like means for removably retaining and suspending an electrical instrument at the end of said conduit;
   d) cooperative coupling means on said hair cutting or styling instruments and cooperating with the retaining means so that said electrical instruments cad be easily lifted off of said retaining means for hair cutting or styling operations and resuspended on said retaining means; and
   e) electrical supply means for supplying electrical power to said instrument.

9. The overhead electrical power supply system of claim 8 further characterized in that a junction box is provided for securement to a wall for receiving a lower end of the generally vertical leg.

10. The overhead electrical power supply system of claim 9 further characterized in that the generally vertical leg of said conduit is operatively hingedly mounted to said wall in such manner that it is swingable relative to said wall.

11. An overhead electrical power supply system for delivery of electrical power to an instrument in an environment which has a generally vertical wall and which is operable with electrical power, said power supply system comprising:
   a) a conduit rotatably secured to said wall and extending outwardly from said wall in an overhead position above the head of a user of the instrument and having a free end thereof;
   b) retaining means at the free end of said conduit for releasably retaining the instrument which is operable with electrical power;
   c) an electrical conductor extending through said conduit and extending to said retaining means for supplying electrical power to said retaining means, said instrument having an electrical cord connected to the conduit so that said instrument can be pulled downwardly and where the cord can be retracted toward the retaining means; and
   d) a winding mechanism associated with said retaining means for winding the electrical cord and holding same when an instrument is connected to said retaining means and which permits unwinding and rewinding of said electrical cord.

12. An overhead electrical power supply system for delivery of electrical power to a plurality of instruments in an environment which has a generally vertical wall and which are operable with electrical power, said power supply system comprising:
   a) a plurality of conduits secured to said wall and extending outwardly from said wall and having free ends;
   b) retaining means at the free ends of certain of said conduits for releasably retaining the instruments which are operative with electrical power and enabling a suspension of such instruments by the retaining means;
   c) electrical conductors located in at least some of the conduits and extending to said retaining means;
   d) an electrical cord extending from each instrument and being connected to a conductor in the conduit to which the instrument is suspended;
   e) a winding mechanism associated with said retaining means for winding and retracting the electrical cord and holding same when an instrument is releasably connected to said retaining means and which permits unwinding and rewinding of said electrical cord; and
   f) means for supplying electrical power through the conductors to each of said retaining means.

13. The overhead electrical power supply system of claim 12 further characterized in that each said retaining means is a spool rotatably mounted on the free end of a conduit and said winding mechanism comprises a spring operated mechanism causing rotation of said spool.

14. An overhead electrical power supply system for delivery of electrical power to an instrument which is operable with electrical power and in an environment which has a generally vertical wall, said power supply system comprising:
   a) a conduit having a generally vertical leg and an angularly bent outwardly struck somewhat horizontal leg;
   b) means for mounting said vertical leg to said generally vertical wall;
   c) means for removably retaining an electrical instrument at the end of said conduit;
   d) electrical supply means for supplying electrical power to said instrument; and
   e) a junction box provided for securement to said generally vertical wall for receiving a lower end of the generally vertical leg.

15. The overhead electrical power supply system of claim 14 further characterized in that the generally vertical leg of said conduit is operatively hingedly mounted to said wall in such manner that it is swingable relative to said wall.

16. The overhead electrical power supply system of claim 15 further characterized in that a bracket means is secured to said wall and said conduit is hingedly mounted to said bracket means.

17. The overhead electrical power supply system of claim 16 further characterized in that said retaining means is a spool rotatably mounted on the free end of a conduit and said winding mechanism comprises a spring operated mechanism causing rotation of said spool.

18. The overhead electrical power supply system of claim 14 further characterized in that the somewhat horizontal leg is provided with a hinge means between the generally vertical leg and the retaining means so that one portion of said somewhat horizontal leg is hingedly moveable with respect to another portion thereof.

* * * * *